United States Patent Office 3,540,165
Patented Nov. 17, 1970

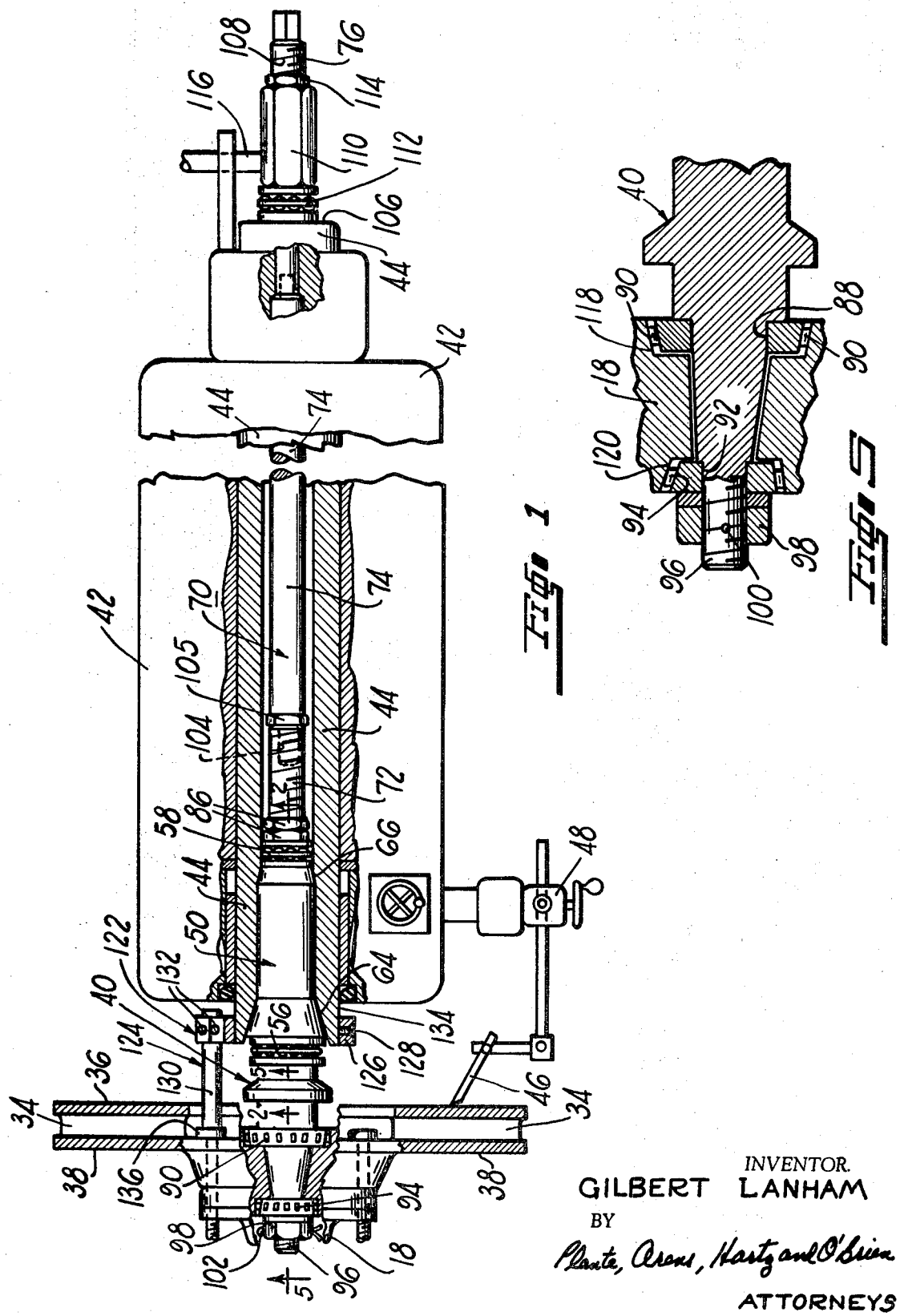

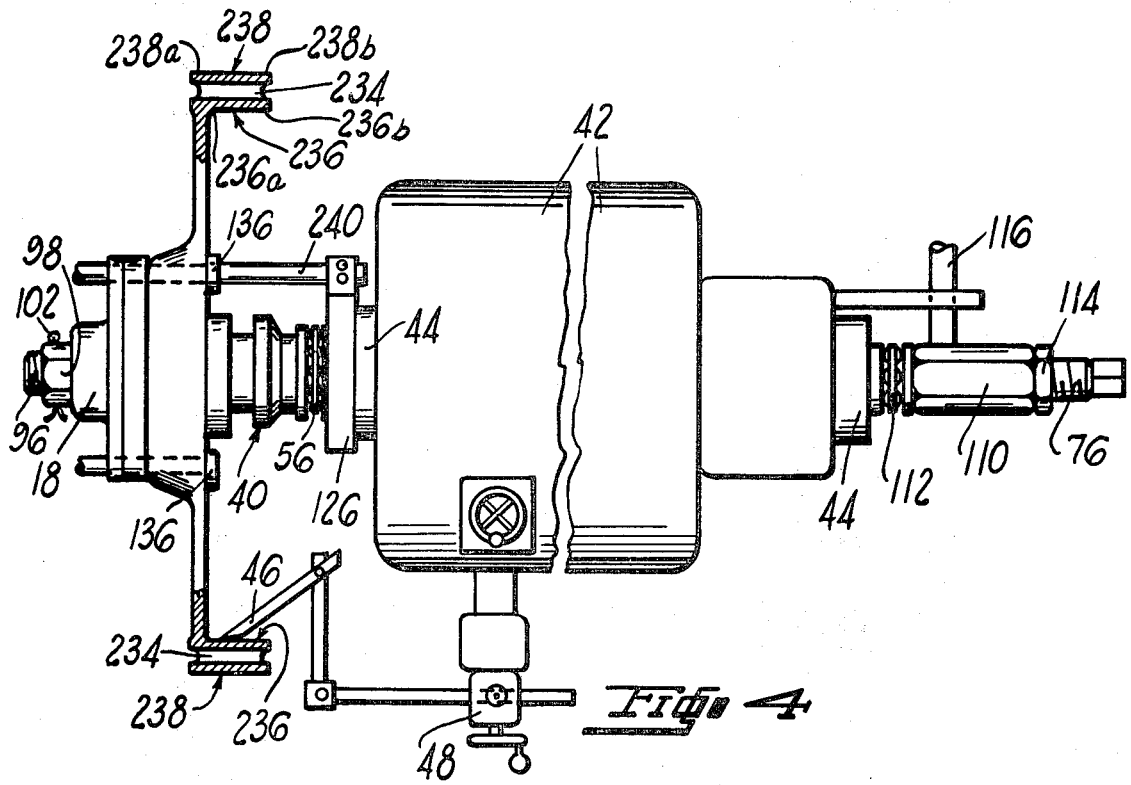
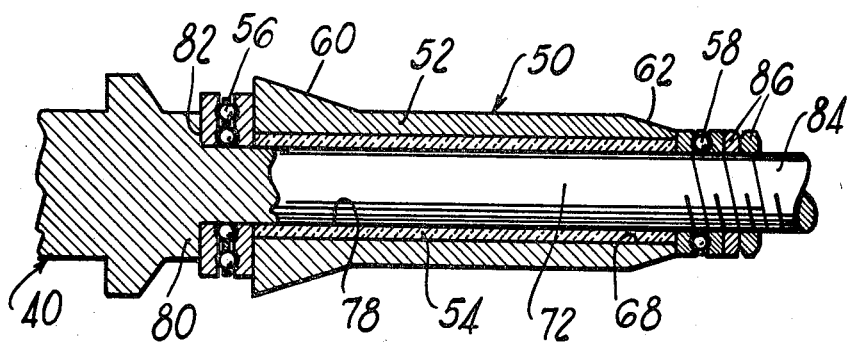

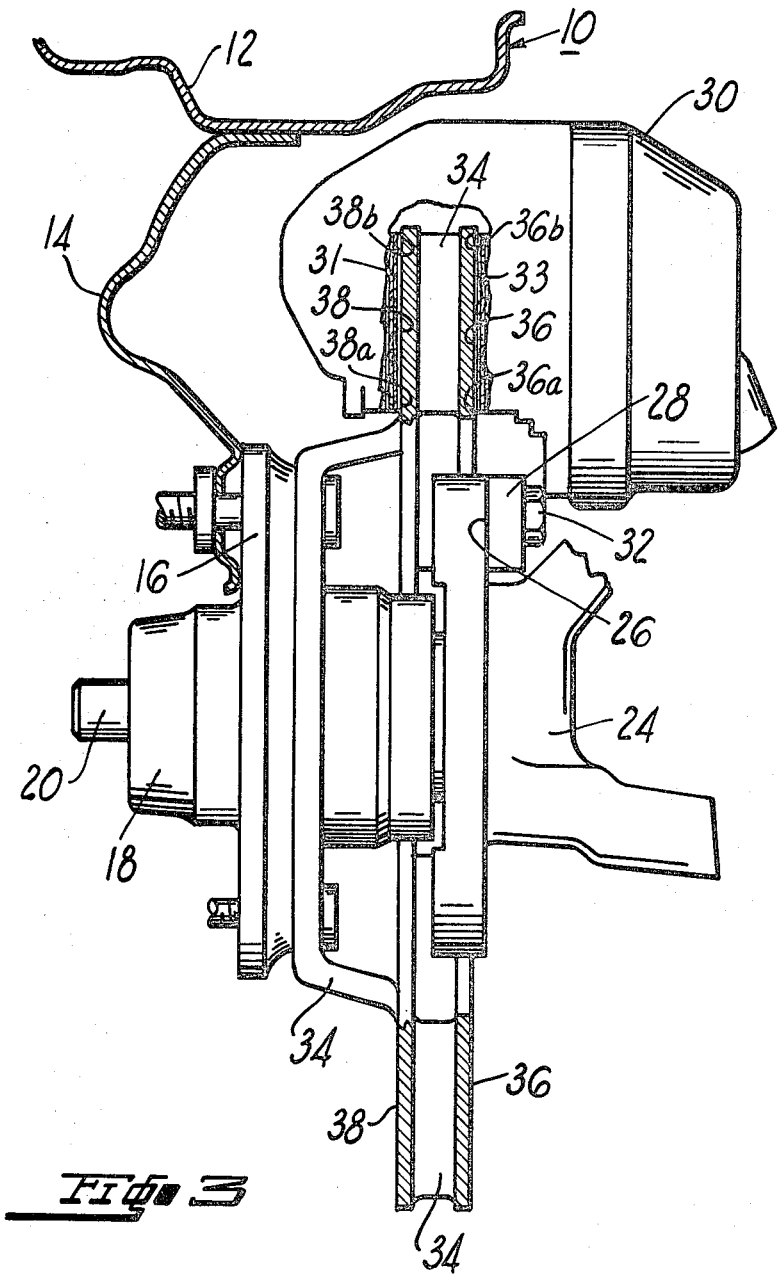

1

3,540,165
DEVICE FOR ROTATABLY HOLDING A BRAKING MEMBER HAVING OPPOSED BRAKING SURFACES FOR MACHINING SAID SURFACES
Gilbert Lanham, South Bend, Ind., assignor to The Bendix Corporation, a corporation of Delaware
Filed Aug. 5, 1968, Ser. No. 750,293
Int. Cl. B24b 5/00; B23b 3/22, 33/00
U.S. Cl. 51—237       15 Claims

ABSTRACT OF THE DISCLOSURE

A device having rotatably mounted thereon a braking member having opposed braking surfaces for machining said surfaces. The rotational mounting of the braking member substantially duplicates the normal operational mounting conditions experienced by said member to improve the quality of the machining of said surfaces.

BACKGROUND OF THE INVENTION

The invention concerns an improvement to devices used in conjunction with disc brakes of the type having opposed braking surfaces equipped with friction lining members for engagement with said braking surfaces during braking actions, for rotatably holding same during machining of said braking surfaces.

The conventional devices or adapters for rotatably holding braking members having opposed braking surfaces to be machined grip the member or disc assembly to be machined such that the disc assembly is rigidly fixed with respect to the shaft on which it is mounted and both rotate together with respect to a cutting or grinding tool used for machining the opposed surfaces. Adapters having tapered or point contact annular surfaces are retained on the rotatable shaft for engagement with the conventional bearing surfaces of the disc assembly. The tolerance variations between the rotatable shaft, the adapters and the disc assembly bearing surfaces are substantially responsible for machining inaccuracies associated with the opposed braking surfaces in terms of disc thickness or parallelism and lateral disc run-out. Lateral disc run-out is defined as lateral deviation along a radial line from the inner to the outer periphery of a disc face or surface, from a radial plane taken through a face of the disc and perpendicular to the axis on which the disc rotates. As may be seen, the lateral run-out may not be the same for both of the opposed braking surfaces. The disc thickness and lateral disc run-out variations described, result in reduced braking efficiency and frequent premature repairs. This undesirable in-service disc brake performance stimulates substantial user discontent and potentially results in unsafe and unreliable vehicle braking by the operator.

SUMMARY OF THE INVENTION

It is an object of this invention to provide a device for rotatably holding a braking member having opposed braking surfaces for complete freedom of rotation of the member with respect to the device on which it is held.

Another object of the invention is to provide operable bearing surfaces adapted to the holding device for engagement with the bearing surfaces of the member or disc assembly having the opposed braking surfaces to substantially eliminate the inaccuracies, in terms of disc thickness or parallelism and lateral disc run-out, resulting from machining of the opposed braking surfaces.

Still another object of this invention is to provide a device that is adaptable to commercially available machines conventionally used for machining disc assemblies having opposed braking surfaces.

Other objects, features and advantages of the invention

2 will be apparent from the following description of the device for rotatably holding a braking member having opposed braking surfaces for machining said surfaces taken in connection with the accompanying drawings.

BRIEF DESCRIPTION OF THE DRAWINGS

FIG. 1 is a plan view of a lathe type machine with sections broken away showing its adaptation to receive the device for rotatably holding a disc brake assembly, the disc brake assembly being shown in partial section;

FIG. 2 is an enlarged sectional view, taken along line 2—2 of FIG. 1;

FIG. 3 is a fragmentary view of a vehicle wheel and associated disc type brake shown partly in section;

FIG. 4 is a modified form of a disc brake shown partly in section; and

FIG. 5 is an enlarged sectional view, taken along line 5—5 of FIG. 1.

DESCRIPTION OF THE PREFERRED EMBODIMENT

Referring briefly to FIG. 3, there is shown a vehicle wheel 10 including rim portion 12 anchored to the central portion 14 which, in turn, is anchored to the hub flange 16. The hub 18 is rotatably carried on the stationary wheel spindle 20 and the brake disc 34 is also anchored to the hub flange 16 so as to be rotatable along with the wheel and hub. The wheel supporting spindle includes an enlarged bracket portion 24 which includes at its upper end a mounting surface 26 to which the downwardly extending portion 28 of the brake caliper 30 is anchored by means of bolts 32. Suitable braking shoes or linings 31 and 33 (partially shown) are mounted within the brake caliper housing on either side of the circular disc 34 for engaging the opposite side faces or surfaces of said disc during the braking operation.

It is important that faces 36 and 38 of circular disc 34 be of uniform thickness and parallel with respect to each other and the braking shoes mounted within the brake caliper housing to insure optimum braking efficiency therebetween. Disc face 36 has an inner annular edge 36a and an outer annular edge 36b, while disc face 38 has an inner annular edge 38a and an outer annular edge 38b. Moreover, it is important that the circular disc 34 does not have lateral run-out between said inner and outer annular edges to further insure parallelism relative to the disc brake caliper housing and its function during a braking application.

Referring now to the drawings and particularly to FIG. 1, illustrating an adaptation of the preferred embodiment of the invention by means of sections broken away, a device having rotatably mounted thereon a number including opposed braking surfaces for machining said surfaces is generally referred to by numeral 40. The device 40 is shown mounted on a conventional lathe or disc finishing machine 42 which has a spindle 44 for receiving device 40. The spindle 44 has a conventional source of rotational power imparted to it by means of peripheral gearing or pulleys (not shown). This positional relationship provides the hub 18 and disc 34 with essentially the same environment as their operational installation on a vehicle, and also allows accessibility to disc faces 36 and 38 with a surface finishing or cutting tool 46 which is adjustably secured by means 48 to the disc finishing machine 42. Although the specific position of the finishing tool 46 with respect to the disc 34 is not critical, it is desirable that the tool 46 be aligned and substantially radially adjustable in a first plane parallel to the axis on which the disc rotates and aligned in a second plane perpendicular to the plane of the disc.

With reference now to FIGS. 1 and 2, the spindle 44 receives a bearing means 50 comprised of a cylindrical means 52, liner 54 and thrust bearings 56 and 58. The cylindrical means 52 is formed with a center cylindrical portion and has tapered ends or surfaces 60 and 62 for frictional engagement with tapered surfaces 64 and 66, respectively, of spindle 44. Cylindrical means 52 has a bore 68 to snugly receive the bronze liner 54. The thrust bearings 56 and 58 may be comprised of conventional washers and ball ring retainers, as shown, or may be fabricated of one piece or as part of the ends of the cylindrical means 52. The bearings 56 and 58, and the liner 54 are of a design that suitably provides a bearing surface for shaft means 70 being comprised of three sections or shafts 72, 74 and 76. Shaft 72 has a bearing surface 78, covered with one of the numerous conventional lubricants, for rotational cooperation with the liner 54. Shaft 72 has a radially projecting ledge 80 having a bearing surface 82 for engagement with the thrust bearing 56. Shaft 72 further has threaded end 84 for receiving conventional locking nuts 86 (see FIG. 1) which function to suitably secure thrust bearing 58 against the cylindrical means 52. It is noted that bearing 58 may be eliminated provided sufficient frictional engagement can be maintained between tapered surfaces 60 and 62, and tapered surfaces 64 and 66, respectively, of spindle 44. The method and structure for obtaining this frictional engagement will be explained hereinafter. As may best be seen in FIG. 5, shaft 72 has near its other end a surface 88 for receiving conventional roller bearing 90 and a surface 92 for receiving conventional roller bearing 94. A threaded end 96 of shaft 72 receives a nut 98 for securing roller bearing 94 in place. A cross bore 100 in the shaft 72 accommodates a cotter pin 102 which also passes through the nut 98 to preclude the latter from unthreading. Shaft 72 has a threaded bore 104 for threadably receiving shaft 74 which projects toward the other end of spindle 44 where it threadably connects with section or shaft 76. A locking nut 105 is interposed between shafts 72 and 74 to assist in preventing disengagement therebetween. The shaft 76 extends past end 106 of spindle 44 and has a threaded portion 108 for receiving a member or nut 110, which when in place as shown, secures a conventional thrust bearing 112 between nut 110 and end 106 of spindle 44 to allow rotation therebetween and insure frictional engagement between tapered surfaces 60 and 62, and tapered surfaces 64 and 66, respectively, of the spindle 44. Nut 110 is held in place by locking means or nut 114. Nut 110 further, has a radial extension 116 for engagement with the lathe or disc finishing machine 42 to prevent rotation of the shaft means 70. Thus, the spindle 44 may rotate within the lathe or disc finishing machine 42 and due to its frictional engagement with bearing means 50, cause bearing means 50 to rotate about said shaft means 70.

The shaft means 70 may be adapted to accept almost any type hub and disc assembly by having the appropriate roller bearings 90 and 94 that are used with the specific hub and disc assembly. The roller bearings 90 and 94 may be either taken from the vehicle wheel on which they were in use or elsewhere, provided they meet the conventional replacement part interchangeability specifications. The hub 18 has closely toleranced bearing surfaces 118 and 120 (see FIG. 5) for mounting, respectively, on roller bearings 90 and 94. Thus, when the hub 18 having disc 34 attached thereto, is mounted on shaft means 70, and specifically roller bearings 90 and 94, the mounting arrangement duplicates the environment in which the hub and disc assembly is operationally mounted and used. It is important to note at this point that surfaces 88 and 92 of shaft means 70 are also tightly controlled from a tolerance standpoint to provide for optimum cooperation with bearings 90 and 94.

It may be parenthetically mentioned that shaft 72 of shaft means 70 may be provided with surfaces 88 and 92 of a smaller or larger diameter and spacing to permit adaptation of hub and disc assemblies of varying sizes for use in association with all types of vehicles.

The hub 18 and disc 34 are responsive to a rotating driver means 122 being comprised of the spindle 44 and a transmitting means 124. The transmitting means 124 is comprised of a collar 126, a set screw 128, a member or shaft 130 and screws 132. The spindle 44 extends past the end of the lathe or disc finishing machine 42 and has thereon a circular surface 134 for receiving the collar 126. The collar 126 has the set screw 128 for securing it to the spindle 44 so that the collar may rotate with the spindle means 44. The member or shaft 130 is rigidly secured to the bifurcated extension of the collar 126 by screws 132 and itself extends axially from the collar for engaging a bolt 136 securing the disc 34 to the hub 18. As may be seen by those skilled in the art, the member or shaft 130 may assume any of the numerous possible shapes for engaging the hub and disc assembly so as to impart rotation thereto. Additionally, the transmitting means 124 may be adjustable axially with respect to the spindle 44, and hub 18 and disc 34.

MODE OF OPERATION OF THE PREFERRED EMBODIMENT

It is assumed that the hub 18 and disc 34 are properly mounted on the shaft means 70 and roller bearings 90 and 94. It is further assumed that the conventional source of rotational power of the disc finishing machine 42 is energized to impart rotation to the spindle 44, the transmitting means 124, and thus, the hub 18 and disc 34.

The cutting tool 46 is positioned axially with respect to the disc face 36 so as to take the desired depth of cut as means 48 is adjusted to move the cutting tool 46 radially inward from the outer periphery 36b to the inner periphery 36a of the disc face. Of course, the cutting tool 46 could just as easily be moved from the inner periphery to the outer periphery if desired. Further, the cutting tool 46 may be reversed and means 48 axially adjusted to facilitate refinishing of disc face 38 in the manner explained above.

Conventional techniques, for refinishing the faces of disc brakes, generally mount the hub and disc assembly on adapters which engage the hub bearing surfaces. The adapters are compressed axially with respect to the bearing surfaces and the shaft on which they are carried to cause the hub and disc assembly to rotate with the shaft during the refinishing of the disc faces. Any foreign material between the adapters and the hub bearing surfaces; or misalignment for any reason of the adapters, or other rotating parts, that would preclude concentricity of the adapters and the bearing surfaces, will cause the hub and disc to wobble during rotation which, in turn, will destroy dimensional control of the refinishing operation.

Specifically, contrary to conventional practices, the present invention provides for rotation of the hub and disc assembly relative to the axis on which it is normally carried by mounting the hub 18 on roller bearings 90 and 94. Therefore, the accuracy of the rotation of the hub 18 and disc 34 with respect to the shaft means 70 allows the cutting tool 46 to refinish the disc faces, in terms of disc parallelism and lateral disc run-out, to tolerances heretofore unattainable.

DESCRIPTION OF THE MODIFIED EMBODIMENT

In the embodiment shown in FIG. 4, those parts which are identical to corresponding parts of the preferred embodiment, FIG. 1, will be given the same identifying numbers.

In the embodiment of FIG. 4, a disc 234 is secured as before to the hub 18. The disc 234 is of the variety that is generally classified as a drum disc. Disc 234 has faces or surfaces 236 and 238 which would be straddled by a brake caliper housing, suitably mounted to the hub 18 and having braking shoes or linings (none shown) mounted within the brake caliper housing on either side of disc 234 for engaging the opposite side faces or surfaces of said disc during the braking operation.

It is important that faces 236 and 238 of disc 234 be of uniform thickness and concentric with respect to each other and the braking shoes mounted within the brake caliper housing to insure optimum braking efficiency therebetween. Disc face 236 has an inner annular edge 236a and an outer annular edge 236b, while disc face 238 has an inner annular edge 238a and an outer annular edge 238b. Moreover, it is important that the disc 234 does not have lateral run-out between said inner and outer annular edges to further insure concentricity relative to the disc brake caliper housing and its function during a braking application. Lateral disc run-out, for the drum disc, is defined as lateral deviation along an axial line from the inner to the outer periphery of a disc face or surface, from an annular axial plane taken through a face of the disc and concentric about and parallel to the axis on which the disc rotates.

The hub 18 and disc 234 are otherwise mounted in the manner described in the preferred embodiment. Although retained by the collar 126 as before, a member or shaft 240, extending axially from the collar 126, engages the bolt 136 for imparting rotation from the spindle 44 to the hub 18 and disc 234.

As will be understood by those skilled in the art, the means 48 may be adjustable axially and radially with respect to the disc faces 236 and 238 for moving tool 46 to refinish said faces.

With regard to the mode of operation of the modified form of disc brake shown in FIG. 4, it is practically identical to the preferred embodiment of FIG. 1 and needs no further description.

More importantly, the improvement in refinishing accuracy of the modified embodiment over conventional techniques is the same as the preferred embodiment.

While the specific details have been herein shown and described, the invention is not confined thereto, as other substitutions can be made within the spirit and scope of the invention.

I claim:

1. A device having rotatably mounted thereon a member provided with opposed braking surfaces for machining said surfaces comprising:
   a supporting means;
   a first bearing means on which said supporting means is carried;
   a second bearing means operatively engaging said supporting means for carrying said member including opposed braking surfaces;
   a retaining means operatively engaging said supporting means, said second bearing means and said member;
   a driver means operatively engaging said member for rotating said member during said machining of said opposed braking surfaces;
   said driver means frictionally engaging said first bearing means to provide support thereof;
   said supporting means and said driver means interconnected through said first bearing means so as to allow relative rotation between said means but maintain a co-axial relationship therebetween.

2. A device as recited in claim 1, wherein said supporting means comprises:
   a shaft means having intermediate its ends a bearing surface for cooperation with said first bearing means;
   said shaft means including on one end a means for substantially precluding axial and rotational movement thereof;
   said shaft means having spaced apart surfaces toward its other end for receiving said second bearing means;
   said shaft means being threaded on said other end for accepting said retaining means.

3. A supporting means as claimed in claim 2, wherein said shaft means is comprised of a plurality of shaft segments secured together to form a single fixed shaft.

4. A supporting means as recited in claim 2, wherein bearing surface comprises:
   a circular surface around the periphery of said shaft; and
   an annular surface formed on a ledge projecting radially from said shaft means.

5. A bearing surface as recited in claim 4, and further including a surface formed by a member projecting radially from said shaft means and being adjustably secured to said shaft means.

6. A supporting means as recited in claim 2, wherein said means for substantially precluding axial and rotational movement comprises:
   a shaft having a threaded bore in one end for engagement with said one end of said shaft means;
   said shaft being threaded externally on its other end;
   a member having a threaded bore for operatively engaging said other end of said shaft;
   an annular bearing means abutting said member and in engagement with said driver means to facilitate rotational movement therebetween and insure frictional engagement between said first bearing means and said driver means as a function of the operative engagement of said member and said shaft;
   said member held in place by a locking means to prevent operative engagement;
   said member having a radial extension for engagement with a fixed means to preclude rotation of said shaft means.

7. A device recited in claim 1, wherein said first bearing means comprises:
   a cylindrical means having tapered ends for frictional engagement with said driver means;
   said cylindrical means having a concentric bore with a bearing member installed therein and surrounding the periphery of said supporting means to carry said supporting means while providing for rotational movement between said cylindrical means and said supporting means; and
   an annular thrust bearing means intermediate said cylindrical means and said supporting means toward the end of said supporting means operatively engaging said second bearing means.

8. A first bearing means as recited in claim 7, wherein said bearing member is a bronze sleeve in frictional contact with said cylindrical means having lubrication between said sleeve and said supporting means.

9. A first bearing means as recited in claim 7, and further including an annular thrust bearing means intermediate said cylindrical means and said supporting means toward the other end of said supporting means.

10. A device, as recited in claim 1, wherein said second bearing means comprises:
    a first roller bearing member in frictional engagement with said supporting means;
    a second roller bearing member in frictional engagement with said supporting means;
    said bearing members having bearing surfaces tapered inward toward each other for rotational engagement with said member including opposed braking surfaces to more closely duplicate, during machining of said opposed braking surfaces, the normal operational mounting conditions experienced by said member.

11. A device as recited in claim 1, wherein said retaining means is comprised of a nut threadably engaging said supporting means and abutting said second bearing means, and a cotter pin secured through said nut and said supporting means to prevent rotation therebetween.

12. A device, as recited in claim 1, wherein said driver means comprises:
    a hollow spindle means being rotatably supported by a fixed means and responsive to a conventional source of rotational power;
    said hollow spindle means receiving therethrough and rotating thereabout said supporting means;

said spindle means having a transmitting means attached thereto and operatively engaging said member including opposed braking surfaces for imparting rotation to said member.

13. A driver means as recited in claim 12, wherein said transmitting means comprises:

a collar adjustably secured around said spindle means to rotate with said spindle means;

said collar having a member secured thereto and extending axially therefrom for engagement with said member including opposed braking surfaces.

14. A device for machining opposed braking surfaces of a disc brake comprising:

a supporting means;

a first bearing means on which said supporting means is carried;

a second bearing means operatively engaging said supporting means for carrying said disc brake;

a retaining means operatively engaging said supporting means, said second bearing means and said member;

a driver means operatively engaging said disc brake for rotating said disc brake during said machining of said opposed braking surfaces;

said driver means frictionally engaging said first bearing means to provide support thereof;

said supporting means and said driver means interconnected through said first bearing means so as to allow relative rotation between said means but maintain a co-axial relationship therebetween.

15. A device for rotating a member provided with opposed braking surfaces to be machined comprising:

a fixed shaft on which said member is carried at one end thereof;

a first bearing means rotatably mounting said member;

a second bearing means co-axially arranged with respect to said first bearing means and located intermediate the ends of said fixed shaft in bearing relationship thereto;

a driving means supportably carried on said second bearing means and operatively connected to said member to induce rotation thereof during machining of said surfaces; and means for bringing said first and second bearing means and said shaft into co-axial alignment to thereby establish a predetermined relationship between the machined braking surfaces and the axis of said member as defined by the co-axial relationship of the first and second bearing means.

References Cited

UNITED STATES PATENTS 2,699,084    1/1955    Ovshinsky _____ 82—40
3,473,269   10/1969    Sattler.

HAROLD D. WHITEHEAD, Primary Examiner

U.S. Cl. X.R.

82—40, 40